United States Patent [19]

Hinkens et al.

[11] Patent Number: 4,914,971

[45] Date of Patent: Apr. 10, 1990

[54] ANTI-ROTATIONAL ASSEMBLY FOR A CABLE TENSION ADJUSTER FOR A LEVER OPERATED BRAKE ACTUATOR

[75] Inventors: George H. Hinkens; James J. Dimsey, both of Milwaukee, Wis.

[73] Assignee: Hayes Industrial Brake, Inc., Mequon, Wis.

[21] Appl. No.: 274,175

[22] Filed: Nov. 21, 1988

[51] Int. Cl.⁴ ............................................. F16C 1/10
[52] U.S. Cl. ............................ 74/502.2; 74/501.5 R; 74/489; 188/24.19
[58] Field of Search ............... 74/502.2, 502.4, 502.6, 74/501.5 R, 489; 188/196 M, 2 D, 24.19

[56] References Cited

U.S. PATENT DOCUMENTS

| | | | |
|---|---|---|---|
| 3,017,962 | 1/1962 | Ingres | 188/196 M |
| 3,381,779 | 5/1968 | Newstead | 188/196 M |
| 3,759,352 | 9/1973 | Toplis | 74/489 |
| 3,998,295 | 12/1976 | Martin | 188/196 M |
| 4,023,653 | 5/1977 | Yoshigai | 74/489 |
| 4,066,147 | 1/1987 | Toyomoto | 74/489 |
| 4,637,273 | 1/1987 | Nagano | 74/489 |
| 4,644,816 | 2/1987 | Cockburn | 74/502.2 |

FOREIGN PATENT DOCUMENTS 340475 5/1936 Italy ....................................... 74/489

Primary Examiner—Gary L. Smith
Assistant Examiner—F. Saether
Attorney, Agent, or Firm—Foley & Lardner

[57] ABSTRACT

An anti-rotation device for a lever operated brake actuator for an all terrain vehicle of the type having brake cables connected to the brakes for the wheels of the vehicle. The actuator including a housing mounted on the vehicle, a lever arm pivotally mounted in the housing and being operatively connected to the brake cables, a sheath enclosing each of the brake cables and having one end secured to the vehicle in close proximity to the brakes. The anti-rotation device including an adjusting member connected to the other end of the sheath and mounted for axial movement in the housing, the adjusting member also including a threaded bore; a cable adjusting member mounted for rotary motion in the housing and having a threaded stud matingly engaging the threaded bore in the adjusting member, a thumb wheel mounted on the threaded stud for adjusting the length of the sheath and a cover mounted on the housing and including a number of ribs for preventing rotation of the thumb wheel.

4 Claims, 2 Drawing Sheets

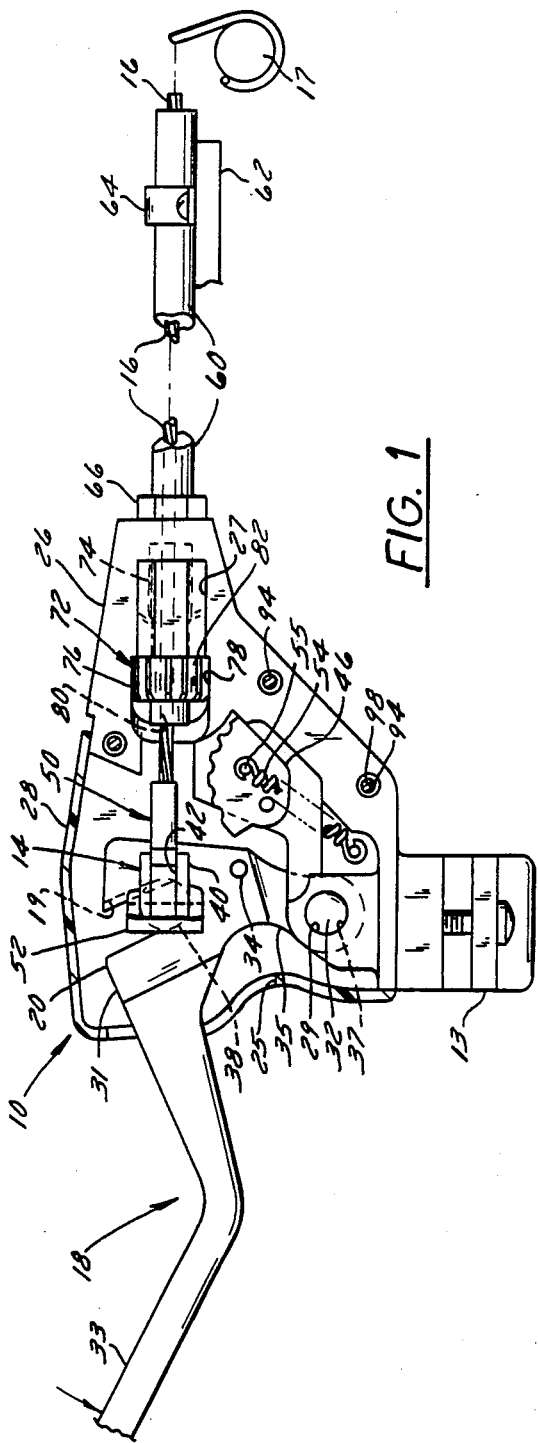

ANTI-ROTATIONAL ASSEMBLY FOR A CABLE TENSION ADJUSTER FOR A LEVER OPERATED BRAKE ACTUATOR

BACKGROUND OF THE INVENTION

Related Application

This application relates to co-pending application Ser. No. 07/136,823 filed Dec. 22, 1987, entitled "Cable Tension Equalizer For A Lever Operated Brake Actuator" now patent No. 4,850,241.

Field of the Invention

Hand operated brake actuators of the type described in patent number 4,850,241 are operated by the driver by squeezing or pushing a lever arm toward a handle bar to apply tension to the brake cables. The tension on the cables is maintained by an equalizer which is mounted on the lever arm for pivotal movement in the plane of the cable as well as the plane of motion of the lever arm. Brake cables are connected to the equalizer at one end and to the brakes at the other end. The cable is housed within a sheath which is connected to the housing for the brake actuator at one end and to the frame of the vehicle at the other end to protect the cable from exposure to the elements. In order for the brake actuator to operate, sufficient tension must be maintained in the cable to assure positive actuation of the brakes when the actuator is squeezed on the handle bar.

SUMMARY OF THE INVENTION

The anti-rotation assembly, according to the present invention, is used to prevent release of the tension in the cable due to vibration of the actuator. This has been accomplished by providing ribs on the inside surface of the cover for the actuator which are positioned to mesh with a cable adjusting screw to prevent rotation of the screw with respect to the cable sheath.

The primary feature of the invention is the provision of an anti-rotation device which is incorporated into the present actuator structure without the addition of any additional parts or any change in the relationship of the parts of the actuator with the housing.

Other principal features and advantages of the invention will become apparent to those skilled in the art upon review of the following detailed description, claims and drawings.

DESCRIPTION OF THE DRAWINGSS

FIG. 1 is a side elevational view of a lever operated brake actuator showing the cable tension adjuster in the housing.

FIG. 2 is a top view of FIG. 1 partly in section showing the cable tension adjusters positioned in the housing.

Figure 3:
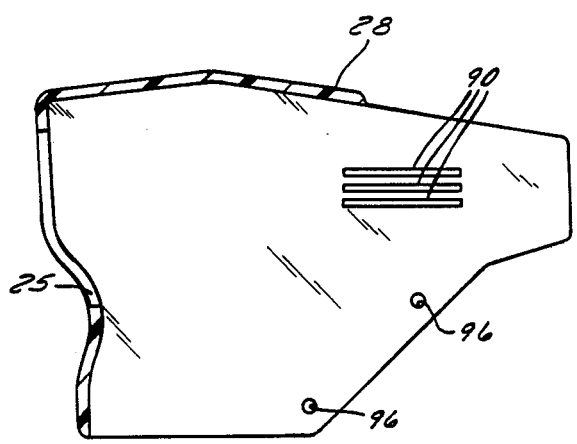
FIG. 3 is a side elevational view in section showing the ribs on the inside surface of the cover.

Although only one embodiment of the invention is explained in detail, it is to be understood that the invention is not limited in its application to the details of construction and arrangements of the components set forth in the following description or illustrated in the drawings. The invention is capable of other embodiments and of being practiced or carried out in various ways. Also, it is to be understood that the phraseology and terminology employed herein is for purposes of description and should not be regarded as limiting.

DETAILED DESCRIPTION OF THE INVENTION

Referring to FIGS. 1 and 2 of the drawings, the lever operated actuator 10 includes a housing 26 which includes a clamp 13 for mounting on the handle bar of an all terrain vehicle (ATV). The lever arm 18 is pivotally mounted in the housing 26. A cable tension equalizer 14 is mounted on the lever arm 18 and is connected to the brake cables 16. One of the brake cables 16 is shown schematically connected to a brake housing 17. The actuator is operated by pivoting the lever arm 18 to apply tension to the brake cables 16. A cam segment 46 is pivotally mounted on the housing 26 to lock the lever arm 18 in the brake position. The cam segment 46 is pivoted by means of pin 55 which extends through a slot 70 in cover 28. The cam segment 46 is moved into engagement with a pin 34 provided on the lever arm 18 and biased by an over center spring 54 in the brake lock and release positions.

The housing 26 includes a pair of multi-sided cable openings 27. As seen in the drawing, the cable openings 27 include six sides. The lever arm 18 includes a main or body portion 31 having an actuating arm 33 extending outwardly from the body portion and a pivot section 35 having a mounting hole 37. The parking brake pin 34 is provided on the side of the body portion 31. An arcuate groove 19 is provided in the body portion which has a curved surface 21. A triangular guide flange 20 is aligned with and spaced from the curved surface 21 of the arcuate groove 19. It should be noted that the distance between the flange 20 and the top of the curved surface 21 at the entrance to groove 19 is smaller than the distance of the flange 20 from the curved surface 21 at the bottom of groove 19. The housing 26 is enclosed by means of a cover 28 having an opening 25. The lever arm is pivotally mounted on a pin 32 which passes through the hole 29 of the housing 26 and hole 37 in the pivot section 35. The actuating arm 33 extends outwardly through the opening 25 on the cover 28.

The brake cables 16 are connected to the cable equalizer 14 by means of the cable connectors 50 which are formed on the ends of the cable 16. The equalizer 14 is free to pivot both in the plane of the brake cables 16 and in the plane of pivotal motion of the lever arm 18 in order to maintain a straight line connection between the cable 16 and the equalizer 14. In this regard, the equalizer 14 is formed from a unitary member having a spherical shape center section 38 which is slightly shorter in height than width. A pair of prongs 40 are provided on each end of the member and are spaced apart a distance to form a slot 42 for the flat body 51 of the cable connector 50. Slots 42 lie in a common line which passes through the center of the spherical section 38 of the equalizer 14 and in the same plane as the cable 16. A curved groove 44 is provided on the back of each of the pairs of prongs 40 and is perpendicular to the plane of the slots 42.

The equalizer 14 is mounted in the arcuate groove 19 in the lever arm by turning the prongs 40 down so that the shorter dimension of the spherical section 38 can pass through the opening between the curved surface 21 and the triangular flange 20. The space between the surface of the flange 20 and the curve of the groove 19 being wide enough to allow for the spherical section to pass through the space when the prongs are turned down and to prevent the removal of the spherical section when the prongs are turned up for connection to the cable 16. With this arrangement, the equalizer 14 cannot be removed from the lever arm 18 when connected to the cable 16.

The equalizer 14 is connected to the cables 16 by sliding the flat body section 51 of the cable connector 50 into the slots 42 in prongs 40 with the cylindrical section 52 seated in the curved groove 44 on the back of the equalizer. The flat section 51 has a thickness substantially equal to the thickness of the slots 42 and the cylindrical section 52 has a diameter corresponding to the radius of the curved groove 44. With this arrangement, the cylindrical section 52 is free to pivot in groove 44 when the equalizer pivots in the plane of the cable 16. When the lever 18 is pivoted in the housing 26, the equalizer 14 will pivot in groove 19 with respect to the plane of motion of the lever arm 18 so that the slots 42 remain in the plane of the cables.

In accordance with the invention, the cable 16 is housed within a sheath 60. The outer end of the sheath 60 is secured to the frame 62 of the vehicle by means of a clamp 64. The other end of the sheath 60 is secured to a multi-sided member 66 which fits in the multi-sided open 27 and matingly engages the sides to prevent rotation of the member 66. The member 66 includes a threaded bore 68. The member 66 is adjustably mounted in the opening 27 by means of a cable adjusting screw 72 which includes a threaded stud 74 and a thumb wheel 76. The threaded stud is screwed into the threaded bore 68 in the member 66 with the thumb screw in abutting engagement with the housing. The thumb wheel is seated in a groove 78 in the housing 20 so that it is free to rotate in the groove but restricted from axial movement with respect to the housing. A cable bore 80 is provided within the adjusting screw to allow for the free motion of the cable 16 axially within the cable adjusting screw.

The thumb wheel is prevented from rotating within the groove 78 by means of an external involute spline 82. The spline 82 including a number of teeth 84. Slack in the cable 16 is taken up by rotating the thumb wheel to move the member 66 axially outwardly of the housing 27 to increase the length of the sheath, the slack in the cable 16 will be taken up by the increased length of the sheath between the two fixed points of the clamp 64 and the thumb screw 76.

Figure 4:
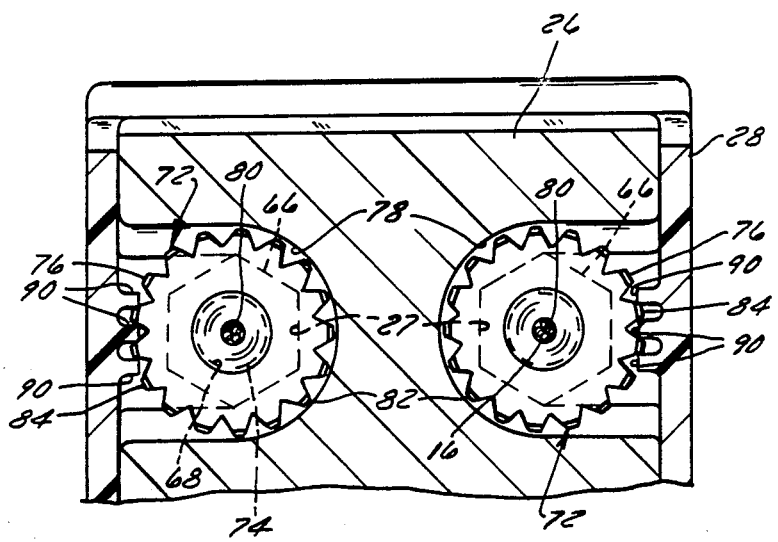
FIG. 4 is a cross sectional view taken on line 4—4 of FIG. 2 showing the engagement of the cover with the involute spline on the adjuster wheel.

The thumb wheel is prevented from rotating in the groove 78 due to vibration of the vehicle by means of ribs 90 provided on the inside surface of the cover 28. As seen in FIG. 4, the ribs 90 extend into the grooves between the teeth 82 on the thumb wheel 76. Once the cable has been adjusted so that the slack is taken out of both of the cables 16 with the cable ends 52 seated in the grooves 44 in the actuating lever, the cover 28 is mounted on the housing 27 with the ribs 90 aligned in the space between the teeth 85. The cover is retained on the housing by means of screws 94 which pass through openings 96 in the cover and openings 98 in the housing.

I claim:

1. An anti-rotation device for a lever operated brake actuator for an all terrain vehicle of the type having brake cables connected to the brakes for the wheels of the vehicle, the actuator including:
    a housing mounted on the vehicle;
    a lever arm pivotally mounted in said housing and being operatively connected to
    the brake cables;
    a sheath enclosing each of the brake cables and having one end secured to the vehicle in close proximity to the brakes;
    said device comprising means for adjusting the length of the cables;
    said means including a member connected to the other end of said sheath and mounted for axial movement in said housing;
    said member including a threaded bore and a cable adjusting member mounted for rotary motion in said housing and having a threaded stud matingly engaging said threaded bore and
    a thumb wheel mounted on said threaded stud for adjusting the length of said sheath;
    and a cover mounted on said housing, said cover including a number of ribs for preventing rotation of said thumb wheel.

2. The device according to claim 1 wherein a housing includes a groove, said thumb wheel being positioned in said groove to prevent axial motion of said thumb wheel.

3. An anti-rotation device for a lever operated brake actuator for an all terrain vehicle of the type having brake cables connected to the brakes for the wheels of the vehicle, the actuator including:
    a housing adapted to be mounted on the vehicle;
    a lever arm pivotally mounted on the housing,
    a cable tension equalizer mounted on said lever arm and being operatively connected to the brake cables,
    and a cover enclosing said housing and said equalizer;
    said device comprising a sheath mounted on each of the cables, each sheath having one end connected to the vehicle;
    means mounted in said housing for adjusting the length of said sheath,
    said adjusting means comprising a member connected to the other end of said sheath and being mounted for axial movement within the housing, said member having a threaded bore;
    an adjusting screw mounted for rotary motion in the housing and including a threaded shaft matingly engaging said threaded bore in said member and a splined wheel mounted on said adjusting screw for rotating said shaft to adjust the position of said member, said wheel having an outer involute splined surface;
    and said cover including a number of ribs on the inside surface thereof for engaging said splined surface of said wheel when mounted on the housing to prevent rotation of said wheel with respect to said member.

4. The device according to claim 3 including means within the housing for preventing axial motion of said wheel with respect ot said housing.

* * * * *